United States Patent
Goto et al.

(10) Patent No.: US 7,896,254 B2
(45) Date of Patent: Mar. 1, 2011

(54) TEMPERATURE REGULATION METHOD AND SYSTEM FOR LOW FLOW RATE LIQUID

(75) Inventors: Hiroyasu Goto, Tsukubamirai (JP); Masahiro Fukuda, Minato-ku (JP); Taro Yamamoto, Minato-ku (JP)

(73) Assignee: SMC Corporation, Tokyo (JP)

( * ) Notice: Subject to any disclaimer, the term of this patent is extended or adjusted under 35 U.S.C. 154(b) by 959 days.

(21) Appl. No.: 11/719,347

(22) PCT Filed: Nov. 7, 2005

(86) PCT No.: PCT/JP2005/020339

§ 371 (c)(1),
(2), (4) Date: May 15, 2007

(87) PCT Pub. No.: WO2006/051745

PCT Pub. Date: Nov. 7, 2005

(65) Prior Publication Data

US 2009/0145489 A1     Jun. 11, 2009

(30) Foreign Application Priority Data

Nov. 15, 2004    (JP) .............................. 2004-330796

(51) Int. Cl.
*F24F 11/053* (2006.01)
*G05D 23/00* (2006.01)
*B41J 2/175* (2006.01)
*B41J 2/18* (2006.01)

(52) U.S. Cl. .................. 236/1 C; 165/296; 347/85; 347/89

(58) Field of Classification Search ............ 165/296, 165/287; 347/89, 95, 92, 93, 85; 236/1 C
See application file for complete search history.

(56) References Cited

U.S. PATENT DOCUMENTS

| | | | | |
|---|---|---|---|---|
| 4,607,261 | A * | 8/1986 | McCann et al. | 347/86 |
| 4,824,073 | A | 4/1989 | Zdeblick | |
| 5,526,026 | A * | 6/1996 | Bowers | 347/6 |
| 6,200,414 | B1 * | 3/2001 | Hwang et al. | 156/345.18 |
| 2003/0132193 | A1 * | 7/2003 | Okamoto | 216/13 |

FOREIGN PATENT DOCUMENTS

JP      52 28338     3/1977

(Continued)

*Primary Examiner*—Chen-Wen Jiang
(74) *Attorney, Agent, or Firm*—Oblon, Spivak, McClelland, Maier & Neustadt, L.L.P.

(57) ABSTRACT

A method and a system for controlling temperature of a liquid in small flow amount, for supplying a liquid whose temperature is highly accurately controlled, as a flow of a small flow amount or an intermittent flow. A liquid supplied from a supply path is pressurized and introduced into a circulation path, and is temperature-controlled by a temperature control device in the circulation path, while being circulated in the circulation path by a pump in the pressurized condition. The liquid is supplied to an exterior device through a discharge path caused to branch from the circulation path, as a consecutive flow in a small amount or an intermittent flow in a small amount in a flow amount less than at least ½ times the flow amount in the circulation path, by adjusting a discharge valve provided in the discharge path.

14 Claims, 3 Drawing Sheets

FOREIGN PATENT DOCUMENTS

| | | |
|---|---|---|
| JP | 53 32047 | 3/1978 |
| JP | 61 94342 | 6/1986 |
| JP | 6 194505 | 7/1994 |
| JP | 9 49904 | 2/1997 |
| JP | 2002-36488 | 2/2002 |
| JP | 2002306488 A * | 10/2002 |
| JP | 2003 86486 | 3/2003 |
| JP | 2003086486 A * | 3/2003 |

* cited by examiner

TEMPERATURE REGULATION METHOD AND SYSTEM FOR LOW FLOW RATE LIQUID

TECHNICAL FIELD

The present invention relates to a method and a system for controlling a temperature of a liquid in a small flow amount appropriate for use in semiconductor-manufacture relating devices or the like, and more specifically to a method and a system for controlling the temperature of the liquid in the small flow amount in a case of supplying a temperature-controlled liquid in high accuracy as a flow in a small amount or an intermittent flow.

BACKGROUND ART

Hitherto, not only in a technical field of a semiconductor-manufacture relating device, but in various kinds of technical fields, technologies for controlling temperature for supplying a liquid whose temperature is controlled in high accuracy is developed (for example, refer to Patent Document 1).

These technologies are developed on the premise that a steadily temperature-controlled liquid is steadily supplied in approximately constant flow amount and therefore the flow amount is relatively large.

However, for example, in a case that a refractive index is adjusted by causing a liquid for adjusting a refractive index to intervene in a light path of an optical system, and the light path is moved in relation to an object in the condition, or the like, it is required that the liquid is supplied into the light path as a flow in a small amount or an intermittent flow, and in addition, it is required that the liquid is supplied in a condition of being temperature-controlled in high accuracy (for example, ±1/100° C.) so as to suppress fluctuation of the refractive index. To such a temperature control in the high accuracy of the flow in a small amount or the intermittent flow, a temperature control technology on the premise of the aforementioned large flow amount is hard to be applied in general.

Further, since the liquid to be the object of the aforementioned temperature conditioning is expensive in general, an unnecessary part of the object cannot be discarded or formed into a contaminated condition by discharging the same in a large amount. Further, even when the liquid is water, since purified water or extra-pure water separated by means of the membrane separation technology is used and the water is thereby relatively expensive resulting in high costs when discharged.

Patent Document 1: Japanese Unexamined Patent Application Publication No. 2003-86486

DISCLOSURE OF INVENTION

Problem to be Solved by the Invention

A technical problem of the present invention is to provide a temperature-control method and a system thereof for controlling a temperature of a liquid in a small flow amount in high accuracy appropriate for use in a semiconductor-manufacture relating devices, or the like.

A further concrete technical problem of the present invention is to provide a temperature-control method and a system thereof capable of forming the liquid in the small flow amount into a liquid to be temperature-controlled in high accuracy, even in a condition of flowing amount in which the liquid in the small flow amount is supplied as a flow in a small amount or an intermittent flow.

Another concrete technical problem of the present invention is to provide a temperature-control method and a system thereof for a liquid in a small flow amount for performing a temperature control of a liquid in high accuracy, and further, for enabling to eliminate impurities mixed in, by enabling to remove particles in the liquid, gas caused to be dissolved, organic materials, metallic ion, or the like in the liquid, during the time the temperature is controlled.

Means for Solving the Problems

A method for controlling temperature of a liquid in a small flow amount in the present invention for solving the aforementioned problems is basically characterized in that a liquid supplied through a supply path is pressurized and introduced into a circulation path, temperature of the liquid is controlled by means of a temperature control device caused to intervene in the circulation path, while causing the liquid to be circulated in the circulation path by means of a pump in the pressurized condition, and the temperature-controlled liquid is supplied to an exterior device as a consecutive flow in a small amount or an intermittent flow in a small amount in a flow amount less than at least ½ times the flow amount in the aforementioned circulation path, through a discharge path caused to branch from the aforementioned circulation path, through a discharge valve provided in the discharge path.

In the preferred embodiment of the aforementioned method for controlling temperature of a liquid in a small flow amount, purified water including extra-pure water, or a liquid having a high refractive index is used as the liquid supplied through the aforementioned supply path. A flowing amount of a circulating liquid in the aforementioned circulation path is preferable to be equal to 2 to 20 times a flowing amount of a discharging liquid from the discharge path for stabilizing the liquid temperature. Further, in a case that impurity exists in the liquid supplied through the supply path, or in a case that a possibility for including the impurity in the circulation path exists, the impurity in the circulating liquid is removed by means of impurity removing device provided in the circulation path.

On the other hand, a system for controlling temperature of a liquid in a small flow amount in the present invention for solving the above-described problems is characterized in including a supply path connected to a supply source of the liquid and including a regulator for pressurizing the liquid supplied from the supply source, a circulation path connected to the supply path and circulating the liquid pressurized by the aforementioned regulator in the pressurized condition by means of a pump, a temperature control device for performing a temperature control operation for the liquid circulating in the circulation path upon being caused to intervene in the aforementioned circulation path, and a discharge path including a discharge valve for supplying the temperature-controlled liquid in the circulation path to an exterior device as a consecutive flow in a small amount or an intermittent flow in a small amount in a flow amount less than at least ½ times the flow amount in the circulation path upon being caused to branch from the aforementioned circulation path.

In the preferred embodiment of the aforementioned system for controlling temperature of a liquid in a small flow amount, purified water including the extra-pure water, or a liquid having a high refractive index is used as the liquid supplied through the aforementioned supply path. A flow amount of the discharge path is preferable to be set such that the flow amount of a circulating liquid in the circulation path is equal to 2 to 20 times the flow amount of a discharging liquid from the discharge path. Further, any one of a filter for removing a particle in the circulating liquid, a vacuum deaerating device for removing gas in the liquid, an ultraviolet oxidization device having a function for oxidizing an organic material, and an ion exchanging device for removing an ionized substance, or a plurality of arbitrary devices selected from those can be caused to intervene in the aforementioned circulation path, as an impurity removing device.

Further, in the preferred embodiment of the system for controlling temperature of a liquid in a small flow amount, according to the present invention, the aforementioned temperature control device is caused to intervene in an outward flow path from a connecting point of the aforementioned supply path with the aforementioned circulation path to a branching point of the aforementioned discharge path with the circulation path. In addition, a tank for reducing a disturbance including fluctuation of an amount of liquid and fluctuation of temperature can be caused to intervene at upstream side from the aforementioned temperature control device in the aforementioned outward flow path. Further, a temperature control device being temperature-controlled by means of a Peltier element controlled on the basis of an output of a temperature detector provided nearer the downstream side in relation to the temperature control device is used as a temperature control device.

Incidentally, in a case that the aforementioned discharge path is relatively long, and a possibility for receiving an influence of ambient air temperature during the time before the temperature-controlled liquid reaches a supply point, the discharge path can be formed from a double tube-type heat exchanger, and a temperature controlled water circulating device for the double tube-type heat exchanger that controls temperature of circulating temperature-controlled water to the same temperature as the temperature of the aforementioned temperature control device can be connected to an outer tube of the double tube-type heat exchanger, or a tube for causing to flow all of or a part of the liquid flowing in the circulation path can be connected to the outer tube of the double tube-type heat exchanger.

According to the aforementioned method and the system for controlling temperature of a liquid in a small flow amount in the present invention, a liquid pressurized by the regulator is introduced into the circulation path through the supply path, the liquid circulating in the circulation path by means of a pump in the pressurized condition is temperature-controlled by the temperature control device caused to intervene in the circulation path in a circulating condition, and is supplied to the exterior device while adjusted to be a consecutive flow in a small amount or an intermittent flow in a small amount in a flow amount less than the flow amount in the aforementioned circulation path by means of the discharge valve in the discharge path caused to branch from the aforementioned circulation path.

Accordingly, the liquid temperature is accurately retained because the liquid pressurized and temperature-controlled in the aforementioned circulation path constantly and stably circulates in a large amount, and the liquid is supplied to the exterior device while forming the same as the consecutive flow in the small amount or the intermittent flow in the small amount. Therefore, the liquid that is retained at a temperature as accurate as possible can be supplied to the exterior device.

ADVANTAGES

According to the aforementioned method and the system for controlling temperature of a liquid in a small flow amount in the present invention, in the circulation path caused to intervene between the supply path and the discharge path, since an accurately temperature-controlled liquid is circulated in a pressurized condition, and the temperature-controlled liquid is configured to be supplied to an exterior device as a consecutive flow in a small amount or an intermittent flow in a small amount in a flow amount less than the flow amount in the aforementioned circulation path by means of the aforementioned discharge valve in the discharge path, the liquid being temperature-controlled in high accuracy by means of circulation is brought to be capable of being supplied to the exterior device such as semiconductor-manufacture relating devices or the like from the aforementioned discharge path.

REFERENCE NUMERALS

1: supply source
2: regulator
3: supply path
4: tank
5: circulation path
6: pump
7: temperature control device
8: filter
9: discharge path
10: discharge valve
20: double tube-type heat exchanger
20*a*: outer tube
21: temperature-controlled water circulation device
30: heat exchanger
31: Peltier element
36: temperature detector

BEST MODE FOR CARRYING OUT THE INVENTION

Figure 1:
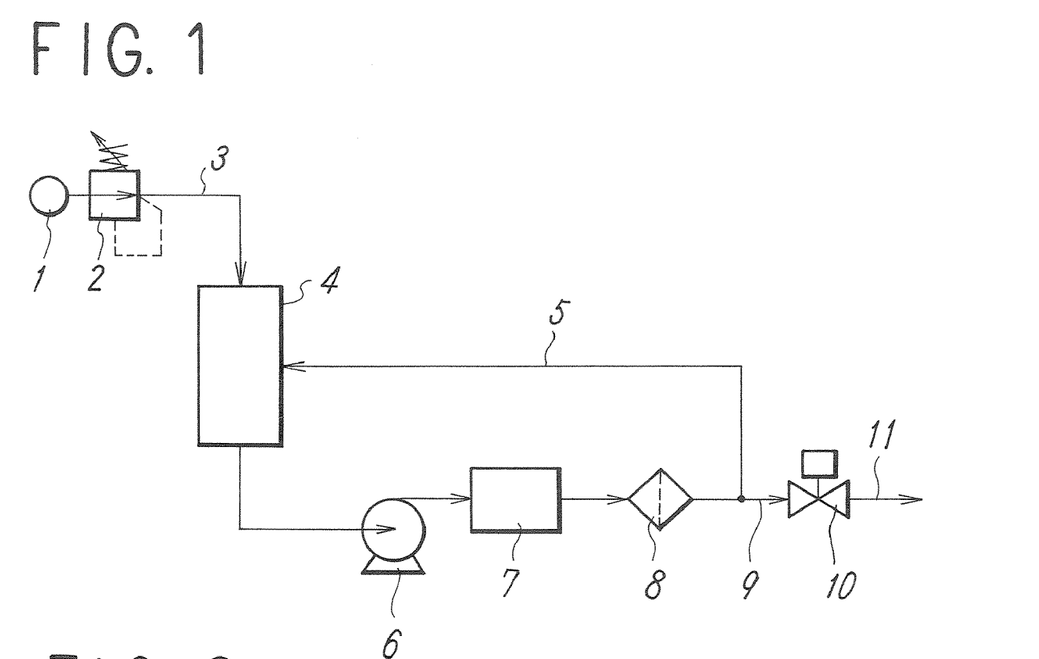
FIG. 1 is a block configuration view showing the first embodiment of a temperature control system for a liquid in a small flow amount according to the present invention.

The first embodiment having a basic configuration of a temperature control system according to the present invention is shown in FIG. 1. Hereinafter, the configuration and a temperature control method of a liquid in a small flow amount according to the present invention are explained.

In the temperature control system, a regulator 2 for pressurizing a liquid supplied from a supply source 1 is provided in a supply path 3 connected to the supply source 1 of a liquid to be temperature-controlled. A circulation path 5 for circulating the liquid, being pressurized by the aforementioned regulator 2, by means of a pump 6 in a pressurized condition is connected to a downstream end of the supply path 3, and in concrete terms, a tank 4 in the circulation path 5 is connected to the downstream end of the supply path 3. The tank 4 is provided for reducing various kinds of disturbance, described later, applied to the circulation path 5.

In the circulation path 5 for the liquid, including the aforementioned tank 4, the pump 6 for forming a circulation flow, a temperature control device 7 for retaining the circulating liquid at a constant temperature, a filter 8 for removing impurities mainly generated in the circulation path 5 are caused to intervene in an outward flow path heading for a branching point to a discharge path 9, described later, from the tank 4 serving as a connecting point with the aforementioned supply path 3 and the aforementioned circulation path 5. Further, the discharge path 9 branching from the circulation path 5 is provided at a downstream side from the filter 8 in the circulation path 5, and a discharge valve 10 for supplying a temperature-controlled liquid from a liquid outlet 11 to an exterior device as a consecutive flow in a small amount or an intermittent flow in a small amount is provided in the discharge path 9.

Further, the outward flow path where the aforementioned discharge path 9 is caused to branch therefrom is connected to the aforementioned tank 4 by means of a back-flow path continuing the outward flow path, and the aforementioned circulation path 5 is formed from the outward path and the back-flow path.

The aforementioned regulator 2 pressurizes the liquid that is supplied through the supply path 3, and supplies to the circulation path 5 in a constant pressurizing condition, and an inner part of the circulation path 5 is formed as a closed space and the liquid filled therein is held in a pressurized condition. Gas in the liquid caused to be dissolved by the pressure is prevented from sparkling by means of the pressure, and the discharge pressure when the liquid is supplied to the exterior device is held at constant pressure, and even when the liquid is intermittently discharged, a stable flow amount is retained.

Further, the aforementioned tank 4 is positioned nearer an upstream side in relation to the aforementioned temperature control device 7 in the outward flow path, and is provided so as to reduce thermal disturbance associated with fluctuation of an amount of the liquid and fluctuation of a temperature by means of a heat capacity of the liquid filled therein. A time constant of a filter for the thermal disturbance is determined by a relationship between a circulating flow amount in the circulation path 5 and the heat capacity. The aforementioned pump 6 is provided for circulating the liquid and performing a stable discharge by securing the discharge pressure to the outside, and it is preferable to use a special pump in which an impeller is floated by magnetic force and performs non-contact rotation resulting in producing no dust, so that the impurity is not discharged into the circulating liquid.

Figure 5:
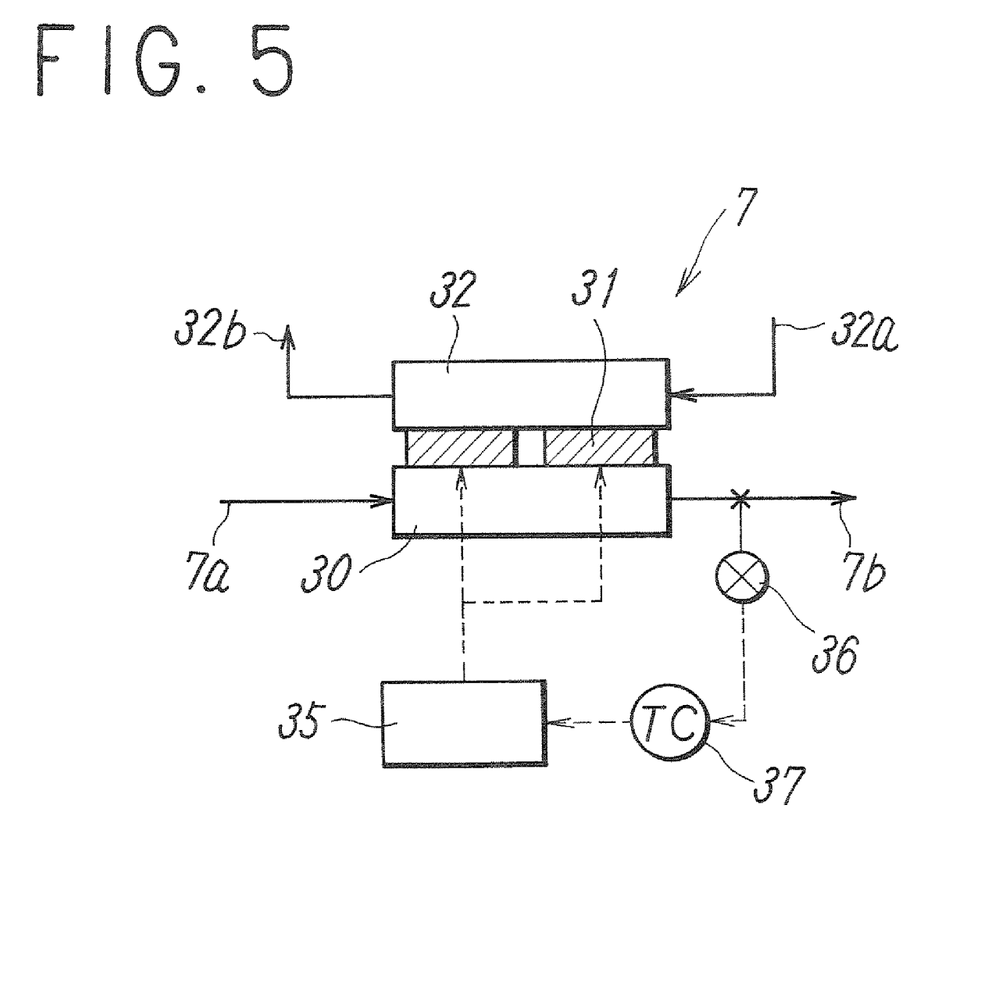
FIG. 5 is a block configuration view showing an example of a construction of a temperature control device used in each of the examples.

As for the aforementioned temperature control device 7, it is preferable to use a temperature control device having a construction whose basic construction is schematically shown in FIG. 5. The temperature control device 7 performs temperature control using a Peltier element, and one surface of a plurality of the Peltier elements 31 is jointed with a heat exchange surface in a heat exchanger 30 provided with a temperature control liquid inlet 7a and a temperature control liquid outlet 7b that are allowed to communicate with the circulation path 5. The other surface of the Peltier element 31 is jointed with a heat exchanger 32 for heat release where heat release water is caused to flow from a heat release water inlet 32a to a heat release water outlet 32b. Further, a temperature detecting device 36 for detecting the temperature of the temperature-controlled liquid is provided at the aforementioned temperature control liquid outlet 7b, and an output of the temperature detecting device 36 is introduced into a temperature controller 37. The temperature controller 37 is configured to output a signal for controlling power distribution to a power distribution control device 35 on the basis of the output from the aforementioned temperature detecting device 36. An entire internal surface of the heat exchanger 30 can be coated with fluoroethylene resin when necessary so as to prevent the circulating liquid from being contaminated.

In addition, the temperature of the circulating liquid detected by means of the temperature detecting device 36 is adjusted by the temperature control device 7 to approach a set temperature set in the temperature controller 37 as close as possible.

The aforementioned filter 8 constituting an impurity removing device is a filter that removes impurities such as a particle or the like in the circulating liquid to be an interference for transmission of light by means of filtration of the circulating liquid. It is preferable to use an ultra-filtration-type filter here. The liquid such as extra-pure water or the like supplied through the supply path 3, generally, does not include the aforementioned impurities, however, when the particle is included in the liquid, or when the particle or the like is secondarily generated during the time the liquid is circulating through the circulation path 5, this filter 8 is effective for removing the impurities including the particle or the like.

The discharge valve 10 provided in the aforementioned discharge path 9 is a valve for supplying the temperature-controlled liquid as the consecutive flow in the small amount or the intermittent flow in the small amount, from the liquid outlet 11 to the exterior device, and an amount of the temperature-controlled liquid discharged from the discharge path 9 is set to a flow amount smaller than at least ½ times that in the circulation path 5. In more concrete terms, when an amount of flow to be discharged from the aforementioned discharge valve 10, which is required by the exterior device, is determined, a flow amount of the circulating liquid of the aforementioned circulation path 5 is set to 2 to 20 times the flow amount of the discharging liquid discharged from the discharge path 9, and preferably, to 4 to 10 times that.

When a case, in which purified water having a flow amount Gs and a temperature $\theta s$ flows into the tank 4, and is discharged from the discharge path 9 in the flow amount Gs, and the temperature $\theta d$ (constant), and circulates in the circulation path 5 in a flow amount Gr, as a model of purified water temperature control system substantially the same system as that shown in FIG. 1, is considered now, it is sufficient to pay attention to behavior of a temperature $\theta m$ of a tank outlet, in which a temperature $\theta s$ has varied, as an evaluation of the circulation system. This is because a temperature $\theta d$ after the purified water has passed through the temperature control device 7 has been brought to have less variation than the temperature $\theta m$ of the tank outlet.

In the aforementioned model, a ratio of a temperature variation of the purified water that is mixed in the tank 4, to the temperature variation of the purified water that flows into the tank 4 is represented by following formula.

$$|\theta m/\theta s|=Gs/(Gr+Gs)$$

At this moment, when a ratio Gr/Gs of the flow amount Gr of the circulating liquid to the flow amount Gs of the discharging liquid is set up from the above-described formula by setting $\theta s \approx 2°$ C., and $\eta m \approx 0.1$ to $0.5°$ C., the ratio is found as $$Gr/Gs \approx 2 \text{ to } 20.$$

That is, in the aforementioned set example (preferred set example), as described above, it is found to be sufficient that the flow amount of the circulating liquid in the circulation path 5 is set to 2 to 20 times the flow amount of the discharging liquid discharged from the discharge path 9. Incidentally, the present inventor has also confirmed by an experiment that this numeric value area is appropriate.

The above-described numeric value, in which the flow amount of the circulating liquid is 2 to 20 times the flow amount of the discharging liquid, is set up under a condition that $\theta s\ 2^\circ$ C., and $\theta m \approx 0.1$ to $0.5^\circ$ C., however, the aforementioned value $\theta s$ is a value required in accordance with a specification of the exterior device, and the aforementioned value $\theta m$ is a value determined by capabilities of the temperature control device 7. Accordingly, when these values are determined, the ratio Gr/Gs of the flow amount Gr of the circulating liquid to the flow amount Gs of the discharging liquid can be set up on the basis of the aforementioned formula.

The aforementioned discharge path 9 is provided branching from the circulation path 5, and is a flow path for discharging the extra-pure water of the required amount corresponding to the specification of the exterior device. The discharge valve 10 provided in this portion is the valve that determines the aforementioned flow amount of the discharging liquid. Accordingly, the discharge valve 10 is configured to be an adjusting valve capable of adjusting a flow amount at least within a necessary area, or is able to be constructed as an adjusting valve capable of intermittently discharging the liquid. In addition, the discharge valve 10 can be constructed as that having a ratio of the flow amount of the circulating liquid to the flow amount of the discharging liquid to be within, for example, 2 to 20.

Further, the discharge path 9 is configured to have a minimum length that is necessary for supplying the liquid to the exterior device, and it is necessary to suppress occurrence of temperature variation during the time the liquid flows in the discharge path 9. Furthermore, it is preferable that the aforementioned discharge valve 10 is installed at a position as close as possible to the circulation path 5 so that the circulating liquid in a large amount reaches an inlet of the discharge valve 10, and influence of the ambient air temperature or the like is eliminated resulting in stabilization of the temperature of the discharged liquid.

Although it is on the premise that the purified water including the extra-pure water, or a liquid having a high refractive index, such as fluoride oil or the like that is excellent at light-permeableness is used as a liquid to be temperature-controlled in the aforementioned temperature control system here, the same is not limited to these liquid mentioned above.

In the temperature control system in the first embodiment having the aforementioned construction, a liquid such as the extra-pure water or the like, in which the metallic ion, the particle, or the organic materials are removed and deaeration is performed, is supplied to the supply path 3 connected to the supply source 1 of the liquid, and the liquid is pressurized by means of the regulator 2 and supplied into the tank 4 as a pressurized liquid, and introduced into the circulation path 5. When the temperature control operation is performed, the circulating flow is formed by means of the pump 6 in the circulation path 5 provided with the temperature control device 7.

The temperature of the liquid of the aforementioned circulating flow is detected by means of the temperature detecting device 36 provided at a downstream side of the temperature control device 7, and the power distribution control device 35 is controlled by means of the temperature controller 37 on the basis of the output of the temperature detecting device 36. The temperature of the liquid mentioned above is adjusted to the set temperature by means of appropriate power distribution to the Peltier element 31.

In this condition, when discharge valve 10 is adjusted so as to discharge the liquid in the predetermined small flow amount, and opened, the circulating liquid is accurately temperature-controlled by means of the temperature control device 7. In addition, since the liquid in such a large amount, which is 2 to 20 times the flow amount of the discharging liquid, preferably, 4 to 10 times that, is circulating in the aforementioned circulation path 5, the liquid in a small amount adjusted to a constant temperature is supplied to the exterior device from the circulation path 5 through the discharge path 9. Further, by means of increasing the flow amount of the circulating liquid compared to the amount of the discharging liquid as described above, a heat exchange rate is improved and a response of the temperature control device 7 becomes good, and the temperature control device 7 is aimed at being miniaturized.

The circulating liquid discharged from the circulation path 5 by supplying the liquid such as the extra-pure water or the like to the exterior device is compensated by means of supplying the liquid from the supply source 1 to the tank 4.

Further, the aforementioned tank 4 is provided with a large heat capacity corresponding to a liquid-containing amount including an internal space of the circulation path 5, and reduces the fluctuation of a flow amount of the discharged liquid, and the fluctuation of the temperature in a short time by an effect of the heat capacity, and is able to exert an excellent temperature-control function. In addition, even when a slight temperature fluctuation occurs in the circulating liquid, the temperature can be adjusted in an extremely short time by means of appropriately setting the capability of the temperature control device 7 that is positioned at a downstream of the tank 4.

Figure 2:
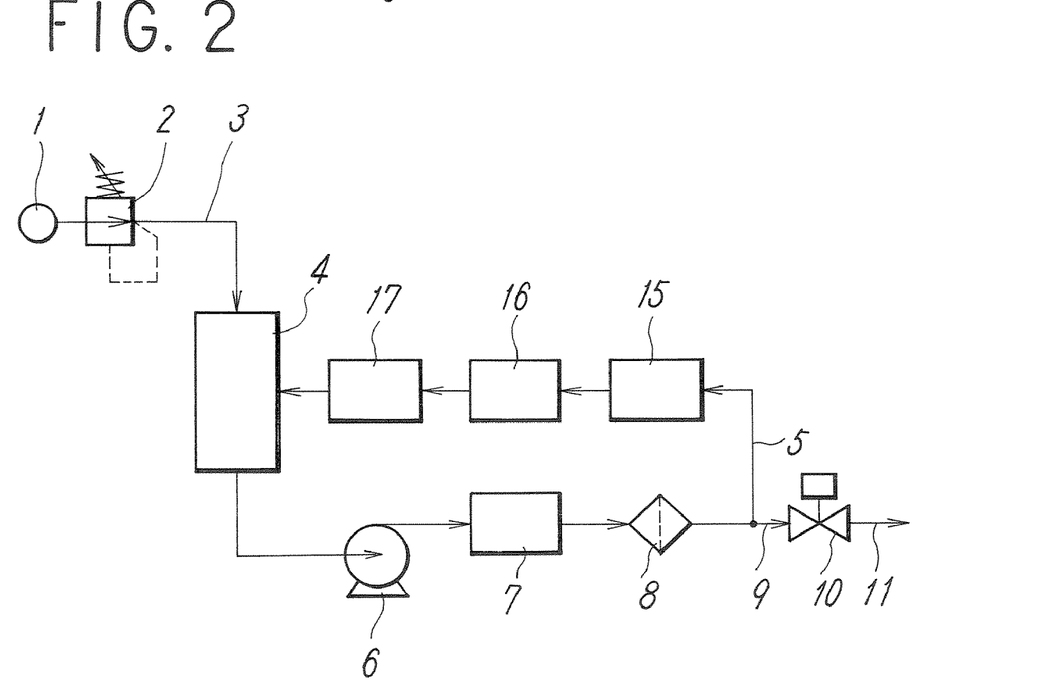
FIG. 2 is a block configuration view showing a variation of the first embodiment.

FIG. 2 shows a variation of the aforementioned first embodiment, in which an ultraviolet oxidization device 15, an ion exchanging device 16, and a vacuum deaerating device 17, constituting the impurity removing device are attached to the back-flow path of the temperature-control system. As for construction in the variation common to the first embodiment, numerals common to the first embodiment are attached, and the explanation will be omitted.

The ultraviolet oxidization device 15 provided in the aforementioned circulation path 5 is a device for oxidizing and resolving organic materials (minute creature, or the like) in the circulating liquid, which is mixed in the liquid supplied through the supply path 3 or generated in the circulation path 5, by means of irradiating the circulating liquid with ultraviolet rays. Depending on a kind of the organic materials, for example, a lens mounted on the exterior device is blurred and a characteristic of a transistor is deteriorated in a device for manufacturing the transistor. Accordingly, the ultraviolet oxidization device 15 is provided for eliminating the causes of the problems mentioned above.

The aforementioned ion exchanging device 16 is a device for eliminating an ionized substance that applies an adverse effect to operations in the exterior device, when being contained in the circulating liquid supplied to the exterior device, by adsorbing or capturing the same.

Further, the vacuum deaerating device 17 is a device for removing the gas dissolved or mixed in the circulating liquid, by means of introducing the gas to a vacuum zone and deaerating the same. Depending on the operations in the exterior device, an air bubble applies an adverse effect to the operations, and therefore, the ion exchanging device 16 is provided for eliminating the causes of the problems mentioned above.

Incidentally, the aforementioned ultraviolet oxidization device 15, the ion exchanging device 16, and the vacuum deaerating device 17 can be independently provided in the circulation path 5, or a plurality of the appropriately selected devices can be provided together. Further, the aforementioned filter 8 in the temperature control system, and the impurity removing devices such as the aforementioned ultraviolet oxidization device 15, the ion exchanging device 16, the vacuum deaerating device 17, and the like that are provided in addition to the same can be installed at an arbitrary position and in an arbitrary order in the circulation path 5.

Figure 3:
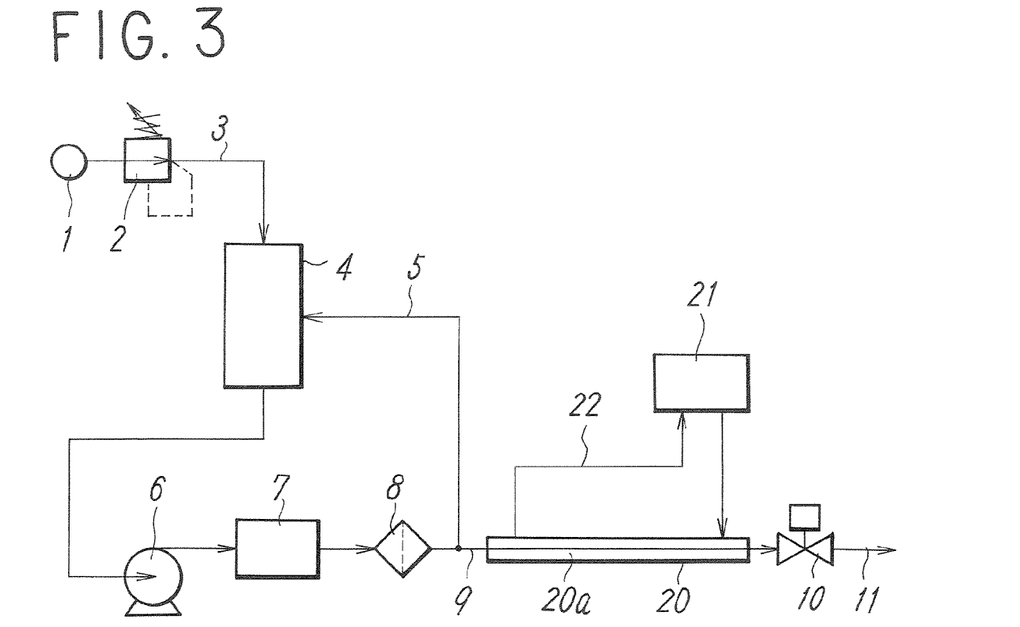
FIG. 3 is a block configuration view showing the second embodiment in which an exhaust path in the first embodiment is formed from a double tube-type heat exchanger.

Next, the second embodiment of the present invention shown in FIG. 3 will be explained. The second embodiment is an embodiment in which the discharge path in the aforementioned first embodiment is formed from a double tube-type heat exchanger and numerals common to the first embodiment is attached to the construction common to that in the first embodiment, and the explanation of the construction is omitted.

The temperature control system in the second embodiment is appropriate for a case that the exterior device to which the temperature-controlled circulating liquid is supplied is distanced from the circulation path 5, and thereby the liquid temperature in the discharge path 9 is hard to be maintained. The aforementioned discharge path 9 is formed from a double tube-type heat exchanger 20, and an internal part of the inner tube serves as the discharge path 9, and both end portions of the outer tube 20a that concentrically surrounds the periphery of the inner tube is connected to a temperature-controlled water circulating device 21 for supplying heat-retaining water being temperature-controlled, through a heat-retaining water circulating path 22. The temperature-controlled water circulating device 21 is a device that controls the temperature of the aforementioned heat-retaining water to be the same temperature as that of the circulating liquid whose temperature is controlled by means of the aforementioned temperature control device 7, and circulates the heat-retaining water in the outer tube 20a of the double tube-type heat exchanger 20 through the heat-retaining water circulating path 22 by means of a pump (not shown). Accordingly, a device having substantially the same construction as the temperature control device 7 explained earlier using FIG. 5 can be used as the temperature-controlled water circulating device 21 according to the necessity.

Figure 4:
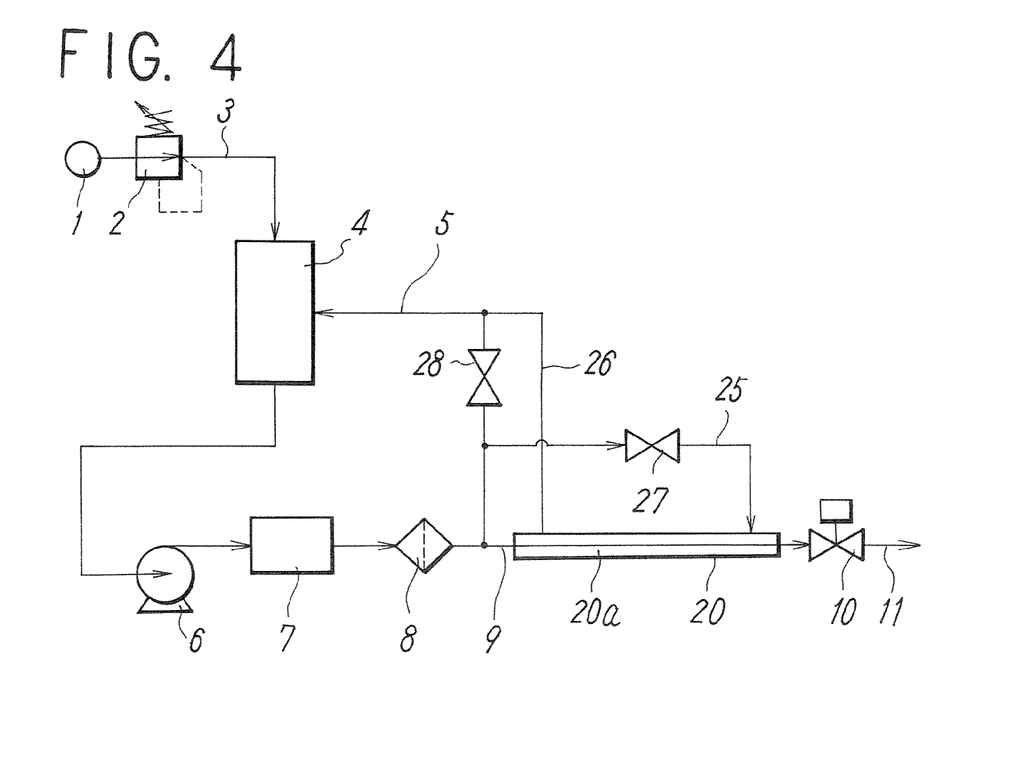
FIG. 4 is a block configuration view showing the third embodiment having a heat-retention type different from that of the second embodiment, in which the exhaust path in the first embodiment is formed from the double tube-type heat exchanger.

The temperature control system in the third embodiment shown in FIG. 4 is, similar to the aforementioned second embodiment, appropriate for a case that the exterior device to which the temperature-controlled circulating liquid is supplied is distanced from the circulation path 5, and thereby the liquid temperature in the discharge path 9 is hard to be maintained. In the third embodiment, similar to the second embodiment, the discharge path in the first embodiment is formed from the double tube-type heat exchanger. However, in the third embodiment, the temperature control device 7 in the circulation path 5 is also utilized for the double tube-type heat exchanger 20, while the temperature-controlled water circulating device 21 for the double tube-type heat exchanger 20 is provided other than the temperature control device 7 in the circulation path 5 in the aforementioned second embodiment.

Incidentally, for the construction in the third embodiment common to that in the first and second embodiments, numerals common to these embodiments are attached to the construction in the third embodiment, and explanation is omitted.

In the temperature control system in the third embodiment, as described above, a branching tube 25 that branches from the back flow path in the circulation path 5 is provided so as to supply the circulating liquid in the aforementioned circulation path 5 to the double tube-type heat exchanger 20. The branching tube 25 is allowed to communicate with one end portion of the outer tube 20a of the double tube-type heat exchanger 20, and the other end of the outer tube 20a is allowed to communicate with a portion situated nearer a downstream side in relation to a branching point of the aforementioned branching tube 25 in the circulation path 5 by means of a back-flow tube 26.

Further, a first valve 27 is provided in the middle of the aforementioned branching tube 25, and a second valve 28 is provided between a branching point of the branching tube 25 and a connecting point of the back-flow tube 26, in the aforementioned circulation path 5.

In the temperature control system, a temperature adjustment for the liquid supplied to the double tube-type heat exchanger 20 is brought to be accurate. This is because, a circulating liquid whose temperature is controlled by means of the circulation path 5 is supplied to the outer tube 20a of the double tube-type heat exchanger 20 for performing heat-retaining operation for the discharge path 9.

Incidentally, in a case of the third embodiment, since the temperature-controlled circulating liquid is supplied into the outer tube 20a of the double tube-type heat exchanger 20, it is preferable for an inner surface of the flow path thereof to be coated with a fluoroethylene resin.

In the temperature control system, by means of closing the second valve 28 at the same time as the aforementioned first valve 27 is opened, all the liquid in the circulation path 5 flows into the outer tube 20a of the double tube-type heat exchanger 20, and on the contrary, by means of opening the second valve 28 at the same time as the aforementioned first valve 27 is closed, the liquid in the circulation path 5 is brought to be stopped to flow into the double tube-type heat exchanger 20. Further, by means of opening both the first valve 27 and the second valve 28, or adjusting the flow amount thereof, an amount of the circulating liquid flowing into the double tube-type heat exchanger 20 can be adjusted.

The invention claimed is:

1. A system for controlling temperature of a liquid in a small flow amount, comprising:
   a supply path connected to a supply source of the liquid and including a regulator for pressurizing the liquid supplied from the supply source;
   a circulation path connected to the supply path and for circulating the liquid pressurized by the regulator in a pressurized condition by a pump;
   a temperature control device for performing a temperature control operation for the liquid circulating in the circulation path upon intervening in the circulation path; and
   a discharge path provided with a discharge valve for supplying the temperature-controlled liquid in the circulation path to an exterior device as a consecutive flow in a small amount or an intermittent flow in a small amount in a flow amount less than at least ½ times the flow amount in the circulation path upon branching from the circulation path,
   wherein the discharge path is formed from a double tube-type heat exchanger, and a tube for causing to flow all of or a part of the liquid flowing in the circulation path is connected to the outer tube of the double tube-type heat exchanger.

2. The system for controlling temperature of a liquid in a small flow amount according to claim 1, wherein the liquid supplied through the supply path is purified water including extra-pure water, or a liquid having a high refractive index.

3. The system for controlling temperature of a liquid in a small flow amount according to claim 2, wherein a flow amount of the discharge path is set such that the flow amount of a circulating liquid in the circulation path is equal to 2 to 20 times the flow amount of a liquid in the discharge path.

4. The system for controlling temperature of a liquid in a small flow amount according to claim 2, further comprising:
an impurity removing device including any one of a filter for removing a particle in the circulating liquid, a vacuum deaerating device for removing gas in the liquid, an ultraviolet oxidization device having a function for oxidizing an organic material, and an ion exchanging device for removing an ionized substance, or a plurality of arbitrary devices selected from those intervening in the circulation path.

5. The system for controlling temperature of a liquid in a small flow amount according to claim 2, wherein the temperature control device intervenes in an outward flow path from a connecting point of the supply path with the circulation path to a branching point of the discharge path with the circulation path.

6. The system for controlling temperature of a liquid in a small flow amount according to claim 5, wherein a tank for reducing a disturbance including fluctuation of an amount of liquid and fluctuation of temperature intervenes at an upstream side from the temperature control device in the outward flow path.

7. The system for controlling temperature of a liquid in a small flow amount according to claim 2, wherein the temperature control device is provided with a temperature control device being temperature-controlled by a Peltier element controlled on the basis of an output of a temperature detector provided nearer the downstream side in relation to the temperature control device.

8. The system for controlling temperature of a liquid in a small flow amount according to claim 2, wherein the discharge path is formed from a double tube-type heat exchanger, and a temperature controlled water circulating device for the double tube-type heat exchanger that controls temperature of circulating temperature-controlled water to the same temperature as the temperature of the temperature control device is connected to an outer tube of the double tube-type heat exchanger.

9. The system for controlling temperature of a liquid in a small flow amount according to claim 1, wherein a flow amount of the discharge path is set such that the flow amount of a circulating liquid in the circulation path is equal to 2 to 20 times the flow amount of a liquid in the discharge path.

10. The system for controlling temperature of a liquid in a small flow amount according to claim 1, further comprising:
an impurity removing device including any one of a filter for removing a particle in the circulating liquid, a vacuum deaerating device for removing gas in the liquid, an ultraviolet oxidization device having a function for oxidizing an organic material, and an ion exchanging device for removing an ionized substance, or a plurality of arbitrary devices selected from those intervening in the circulation path.

11. The system for controlling temperature of a liquid in a small flow amount according to claim 1, wherein the temperature control device intervenes in an outward flow path from a connecting point of the supply path with the circulation path to a branching point of the discharge path with the circulation path.

12. The system for controlling temperature of a liquid in a small flow amount according to claim 11, wherein a tank for reducing a disturbance including fluctuation of an amount of liquid and fluctuation of temperature intervenes at an upstream side from the temperature control device in the outward flow path.

13. The system for controlling temperature of a liquid in a small flow amount according to claim 1, wherein the temperature control device is provided with a temperature control device being temperature controlled by a Peltier element controlled on the basis of an output of a temperature detector provided nearer the downstream side in relation to the temperature control device.

14. The system for controlling temperature of a liquid in a small flow amount according to claim 1, wherein the discharge path is formed from a double tube type heat exchanger, and a temperature controlled water circulating device for the double tube type heat exchanger that controls temperature of circulating temperature controlled water to the same temperature as the temperature of the temperature control device is connected to an outer tube of the double tube type heat exchanger.

* * * * *